US009587771B2

United States Patent
Walsh

(10) Patent No.: US 9,587,771 B2
(45) Date of Patent: Mar. 7, 2017

(54) SELF-DRAINING HOSE

(71) Applicant: Roger C. Walsh, Toronto (CA)

(72) Inventor: Roger C. Walsh, Toronto (CA)

(*) Notice: Subject to any disclaimer, the term of this patent is extended or adjusted under 35 U.S.C. 154(b) by 46 days.

(21) Appl. No.: 14/395,452

(22) PCT Filed: Apr. 12, 2013

(86) PCT No.: PCT/CA2013/000353
§ 371 (c)(1),
(2) Date: Oct. 17, 2014

(87) PCT Pub. No.: WO2013/155596
PCT Pub. Date: Oct. 24, 2013

(65) Prior Publication Data
US 2015/0129075 A1    May 14, 2015

Related U.S. Application Data

(63) Continuation-in-part of application No. 13/450,417, filed on Apr. 18, 2012, now abandoned.

(51) Int. Cl.
F16L 11/04    (2006.01)
F16L 11/00    (2006.01)
F16L 11/12    (2006.01)

(52) U.S. Cl.
CPC .............. F16L 11/00 (2013.01); F16L 11/12 (2013.01)

(58) Field of Classification Search
CPC .............. F16L 11/00; F16L 11/20; E03B 7/12
(Continued)

(56) References Cited

U.S. PATENT DOCUMENTS 460,924 A †  10/1891  Stowe
724,129 A †   3/1903  Schrader
(Continued)

FOREIGN PATENT DOCUMENTS

CA    1122877           5/1971
DE    8313720 u1 †      1/1984
(Continued)

OTHER PUBLICATIONS

Plastics Technology, No. 20—Thermoplastic Elastomers, 4 pages, Oct. 2005, Gardner Business Media, Inc., Cincinnati, Ohio.†
(Continued)

Primary Examiner — Patrick F Brinson
(74) Attorney, Agent, or Firm — Lynn C. Schumacher; Stephen W. Leonard; Hill & Schumacher

(57) ABSTRACT

The present disclosure provides a self-draining hose. The self-draining hose includes a flexible hose connected to an inlet end fitting and an outlet end fitting and defines a fluid passage through the flexible hose. The flexible hose is made from an elastomer material having a memory with a cross-sectional flat profile defining a collapsed position closing the fluid passage, and has is expandable to an expanded position opening the fluid passage. In use, upon introduction of a pressurized fluid at the inlet end fitting the flexible hose expands from the collapsed position to the expanded position to permit flow of the fluid through the fluid passage towards the outlet end fitting. Upon termination of the introduction of the pressurized fluid at the inlet end fitting the memory of the elastomer material collapses the flexible hose from the expanded position to the collapsed position expelling the fluid from the fluid passage.

13 Claims, 6 Drawing Sheets

300

(58) Field of Classification Search
USPC .............. 138/115, 28, 30, 119, 46, 93, 109; 137/852, 843, 877; 239/106, 566; 251/61.1
See application file for complete search history.

(56) References Cited

U.S. PATENT DOCUMENTS

| | | | |
|---|---|---|---|
| 2,067,078 A | | 1/1937 | Faber |
| 2,734,462 A | | 2/1956 | Schaefer |
| 2,753,215 A | | 7/1956 | Barr |
| 2,908,938 A | † | 10/1959 | Taylor |
| 3,116,760 A | * | 1/1964 | Richard ............... B29C 47/0023 138/125 |
| 3,567,134 A | | 3/1971 | Smith |
| 3,581,778 A | † | 6/1971 | Korejwa et al. |
| 3,626,985 A | | 12/1971 | Erickson |
| 3,698,195 A | | 10/1972 | Chapin |
| 3,900,545 A | | 8/1975 | Korejwa et al. |
| 3,903,929 A | | 9/1975 | Mock |
| 3,908,208 A | * | 9/1975 | McIlroy ................. E03C 1/284 137/247.49 |
| 3,998,392 A | | 12/1976 | St. Clair |
| 4,131,399 A | * | 12/1978 | Calvet ................. F04B 43/0072 138/118 |
| 4,215,726 A | | 8/1980 | Tagami |
| 4,272,021 A | | 6/1981 | Standal |
| 4,368,219 A | | 1/1983 | Nagata et al. |
| 4,410,013 A | | 10/1983 | Sadaki et al. |
| 4,590,971 A | | 5/1986 | Webster et al. |
| 4,663,107 A | † | 5/1987 | Takada |
| 5,083,742 A | | 1/1992 | Wylie et al. |
| 5,423,353 A | * | 6/1995 | Sorensen ................ F16L 39/02 138/109 |
| 5,445,356 A | | 8/1995 | Walsh |
| 5,681,627 A | * | 10/1997 | Mueller .................. B32B 27/40 428/220 |
| 5,746,255 A | * | 5/1998 | Walsh ...................... E03B 7/12 138/109 |
| 6,095,571 A | † | 8/2000 | MacDuff |
| 6,260,769 B1 | † | 7/2001 | Hoover |
| 6,524,673 B1 | † | 2/2003 | Bhattacharyya |
| 6,991,181 B2 | † | 1/2006 | Alexander |
| 7,469,935 B2 | * | 12/2008 | Smahl ..................... F16L 47/24 285/133.11 |
| 2005/0194469 A1 | * | 9/2005 | Masarwa ............... A01G 25/02 239/542 |
| 2008/0178957 A1 | * | 7/2008 | Thomas ................. E03C 1/025 138/121 |
| 2010/0006171 A1 | * | 1/2010 | Tomlin .................. A61B 19/54 138/104 |
| 2010/0288390 A1 | † | 11/2010 | Colbachini |
| 2012/0191037 A1 | * | 7/2012 | Patel .................... F16K 5/0407 604/30 |

FOREIGN PATENT DOCUMENTS

| | | | |
|---|---|---|---|
| DE | 102005060221 A1 | † | 7/2005 |
| EP | 0748972 B1 | † | 9/1999 |
| EP | 0748972 B2 | † | 9/1999 |

OTHER PUBLICATIONS

NSF Product and Service Listings, 4 pages, 2012, NSF International.†
Bayer TEXIN Data Sheets, 8 pages, Feb. 24, 2009, Bayer MaterialScience Statements.†

\* cited by examiner
† cited by third party

100

(a)

(b)

(c)

(d)

(e)

SELF-DRAINING HOSE

CROSS-REFERENCE TO RELATED APPLICATIONS

This application is filed as a continuation-in-part of U.S. application Ser. No. 13/450,417 filed Apr. 18, 2012 (18.04.2012).

This application claims the benefit of 35 USC 119(e) to U.S. application Ser. No. 13/450,417 filed Apr. 18, 2012 (18.04.2012), the content of which is incorporated herein by reference.

SCOPE OF THE INVENTION

The present invention relates to hoses, and more particularly to self-draining hoses.

BACKGROUND OF THE INVENTION

The weather-proofing of water systems to prevent freeze-up and associated damage has been the focus of many patents. However the search for reliable, low-cost systems still proceeds in view of the defects, drawbacks and high installed and operating costs of the systems presently available.

The present invention relates to the subject matter found in Canadian Patent No. 1,122,877 Gauthier, May 1971. One of the drawbacks of the earlier Gauthier system has been the absence of a reliable, low cost weather-proof (i.e. freeze-insensitive or "frost-free") hose. The prior art Gauthier hose provision comprises a smaller diameter hose threaded through the interior of a larger outer hose. The inner hose has a thick wall that stretches under pumping pressure, so as to provide elastic, contractive energy upon the cessation of pumping, to thereby assist in the expulsion of water from the inner hose, as an effective portion of the dewatering process.

Previous manufacture of the inner and outer hoses as separate entities, with their combination into the desired frost-free format required their assembly by drawing the smaller hose within the larger hose. Due to the practical difficulties involved in this "threading" operation, the length of such a compound hose was limited to about approximately thirty two meters (i.e. about one hundred feet), the threading operation being both difficult and time consuming.

The applicant has previously disclosed in U.S. Pat. No. 5,445,356 a system for pumping liquids that are subject to solidification in the line which uses a compressed gas as an expulsion medium for the liquid. The compound hose pipeline has a variable volume gas chamber adjacent a transfer passage, extending the length of the pipeline. The line includes an outer hose that provides an air annulus about a collapsible inner hose, through which the pumped liquid can flow. Air or other gas admitted to the annulus operates to expel the liquid from the inner hose, either upon the loss of pressurization of the liquid in the inner hose, or upon the application of adequate pressure within the gas annulus to discharge the liquid from the inner hose.

The applicant has also previously disclosed in U.S. Pat. No. 5,746,255 a pipeline compound hose having an elastomeric inner hose circumscribed by a high strength plastic outer hose with a sealed air cavity disposed there between. The elastic memory of the inner hose contributes to the de-watering capability of the inner hose together with the residual pressure within the sealed air cavity. The sealed enclosure of the pipeline includes sealed end-fittings to prevent air leakage from the sealed air cavity.

BRIEF SUMMARY OF THE INVENTION

The present disclosure provides a hose that is self-draining to avoid freeze-up and water heating when between pressurized flow periods.

In one aspect, the present invention provides a self-draining hose. The hose includes a flexible hose connected to an inlet end fitting and an outlet end fitting and defining a fluid passage through the flexible hose, the flexible hose comprises an elastomer material having a memory with a cross-sectional flat profile defining a collapsed position closing the fluid passage, the flexible hose being expandable to an expanded position opening the fluid passage; whereby, in use, upon introduction of a pressurized fluid at the inlet end fitting the flexible hose expands from said collapsed position to said expanded position to permit flow of the fluid through the fluid passage towards the outlet end fitting, whereby upon termination of the introduction of the pressurized fluid at the inlet end fitting the memory of the elastomer material collapses the flexible hose from said expanded position to said collapsed position expelling the fluid from the fluid passage.

In some embodiments, the flexible hose is made from a thermoplastic elastomer material, such as a thermoplastic polyurethane material having a tensile strength between 5,000 to 11,000 psi, has a Shore A durometer range between 75 and 95, and is sufficiently stretchable to allow the fluid in the fluid passage to flow around impediments blocking the flow of the fluid through the fluid passage.

In some embodiments, the flexible hose is produced by extrusion through a polished or plated dye to form the flexible hose having a cross-sectional flat profile with a surface smoothness selected to prevent adherence of bacteria or algae thereon.

In some embodiments, the flexible hose and end fittings are composed of a NSF approved material.

In some embodiments, the flexible hose has an internal diameter of at least 5/8 inches and a wall thickness of at least 0.045 inches.

In some embodiments, the flexible hose is transparent, and may include phosphorescent additives or light bending additives.

In some embodiments, the flexible hose remains flexible up to −40° C.

In some embodiments, the inlet end fitting and/or the outlet end fitting are sealing secured to the flexible hose by a crimp-type ring clamp.

In some embodiments, the flexible hose and end fittings are fully recyclable.

In some embodiments, the flexible hose defines a plurality of apertures extending between the fluid passage and an exterior of the flexible hose. The apertures may be aligned linearly along a length of the flexible hose, and the outlet end fitting may act as end cap of the flexible hose.

In another aspect, the present invention provides a self-draining hose. The hose includes a flexible inner hose connected to an inlet end fitting and an outlet end fitting and defining a fluid passage through the inner hose, the inner hose comprising an elastomer material and having a collapsed position closing the fluid passage and an expanded position opening the fluid passage; a flexible outer hose disposed about the inner hose and being connected to the inlet end fitting and the outlet end fitting, and defining a sealed space disposed between the inner hose and the outer hose, the space having a predetermined initial pressure; whereby, in use, upon introduction of a pressurized fluid at the inlet end fitting at a pressure exceeding the predetermined initial pressure, the inner hose expands from said collapsed position to said expanded position to permit flow of the fluid through the fluid passage towards the outlet end fitting, said expanded position increasing the pressure in the space from said predetermined initial pressure, whereby upon termination of the introduction of the pressurized fluid at the inlet end fitting the increased pressure in said space collapses the inner hose to said collapsed position expelling the fluid from the fluid passage.

In some embodiments, the inner hose elastomer material has a memory with a cross-sectional flat profile, whereby upon termination of the introduction of the pressurized fluid at the inlet end fitting the memory of the elastomer material together with the increased pressure in said space collapses the inner hose to said collapsed position expelling the fluid from the fluid passage.

In some embodiments, the inner hose is made from a thermoplastic elastomer material, such as a thermoplastic polyurethane material having a tensile strength between 5,000 to 11,000 psi and is sufficiently stretchable to allow fluid in the fluid passage to flow around impediments blocking the flow through the fluid passage, and the outer hose is made from a polyethylene elastomer material having a tensile strength between 1,000 to 4,000 psi.

In some embodiments, the inner hose is produced by extrusion through a polished or plated dye to form the inner hose with the cross-section flat profile with a surface smoothness selected to prevent adherence of bacteria or algae thereon.

In some embodiments, the inner hose is composed of a NSF 61 approved material.

In some embodiments, the inner hose has a wall thickness between 0.010 to 0.045 inches and the outer hose has a wall thickness between 0.020 inches to 0.075 inches.

In some embodiments, the inner hose and the outer hose are transparent, and the outer hose may include phosphorescent additives and/or light bending additives.

In some embodiments, in the collapsed position the outer hose has a visually soft substantially oval cross-sectional profile, and in the expanded position the outer hose has a visually hard substantially round cross-sectional profile.

In some embodiments, the outer hose is made from a woven fire hose material with an elastomeric interior coating, an elastomeric material, or a corrugated hose material.

In some embodiments, the outer hose is an extruded or molded elastomer material having memory with a cross-sectional flat profile.

In some embodiments, the outer hose is made from a polyolefin elastomer material.

In some embodiments, the sealed space extends between the inlet end fitting and an outlet end fitting.

In some embodiments, the predetermined initial pressure of the space is at least 5 psi.

In some embodiments, the self-draining hose includes an air valve in communication with said space. The air valve may be provided in the inlet end fitting and/or the outlet end fitting, and may be a ball and spring assembly or an elastomer orifice to be used with a needle.

In some embodiments, the self-draining hose includes a plastic or metal wire of sufficient rigidity arranged in at least one of the outer hose and the space, and the metal wire may be used as a signal conductor.

In some embodiments, the self-draining hose remains flexible up to −40° C.

In some embodiments, the inlet end fitting and/or the outlet end fitting are barbed end fittings.

In some embodiments, the self-draining hose includes a bushing disposed about the inner hose to secure the inner hose against an outer surface of the inlet end fitting and/or the outlet end fitting; and a circular clamp is applied about the bushing to sealingly secure the inner hose to the inlet end fitting and/or the outlet end fitting. The self-draining hose may also include a second circular clamp disposed about the outer hose to sealingly secure the outer hose against the outer surface of the inlet end fitting and/or the outlet end fitting.

In some embodiments, the self-draining hose includes a bushing disposed about the inner hose to secure the inner hose against an outer surface of the inlet end fitting and/or the outlet end fitting; and a circular clamp is applied about the outer hose over an area of the bushing to sealingly secure the outer hose and the inner hose to the inlet end fitting and/or the outlet end fitting.

In some embodiments, the inner hose has a Shore A durometer range between 35 and 95 and the outer hose has a Shore A durometer range between 60 and 95.

In other embodiments of the invention, any of the aspects above can include one or more of the above features. One embodiment of the invention can provide all of the above features and advantages. These and other features will be more fully understood by reference to the following description and drawings, which are illustrative of exemplary embodiments of this invention.

BRIEF DESCRIPTION OF THE SEVERAL VIEWS OF THE DRAWING

Reference may now be had to the following detailed description taken together with the accompanying drawings in which.

DETAILED DESCRIPTION OF THE INVENTION

Figure 1:
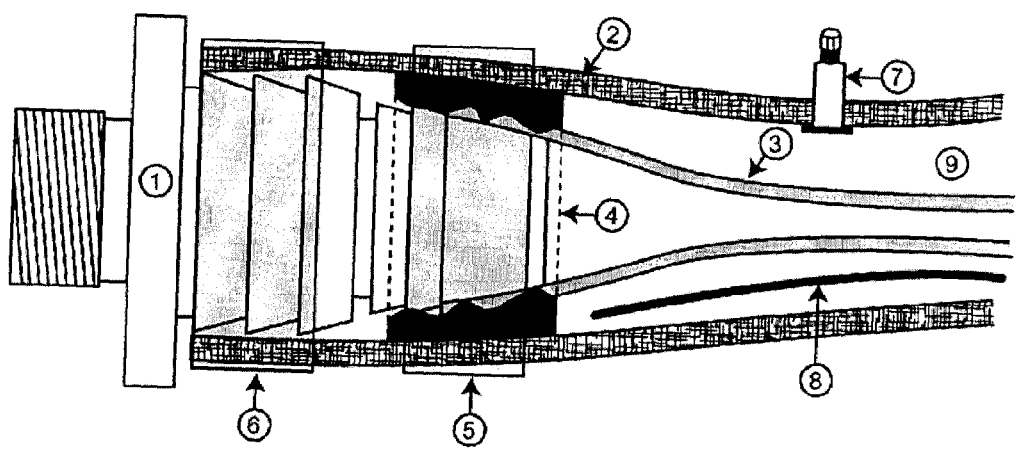
FIG. 1 is a diagrammatic cross section view of a self draining hose in accordance with a first embodiment of the invention.

Reference may now be made to FIG. 1 which illustrates a preferred embodiment of a self-draining hose 100 in accordance with a first embodiment of the present invention.

The self-draining hose 100 includes a flexible inner hose 3, a flexible outer hose 2, an inlet end fitting 1 and an outlet end fitting (not shown).

Figure 2:
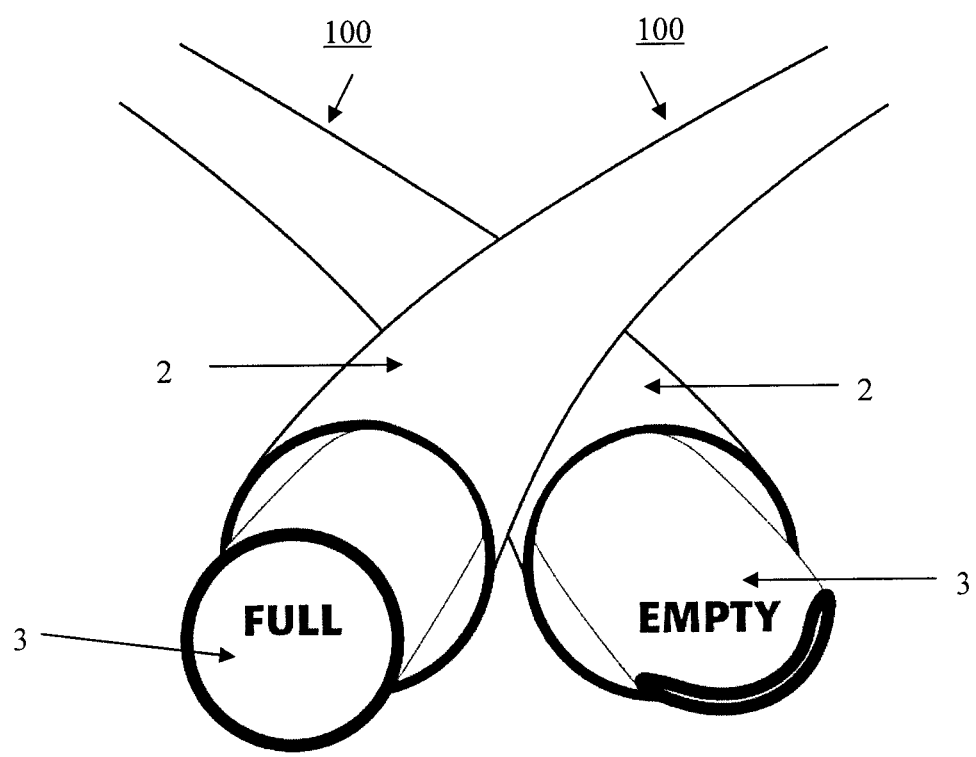
FIG. 2 is a diagrammatic cross section view of two self draining hoses in accordance with FIG. 1, showing the inner hose in an expanded and collapsed position, respectively.

The inner hose 3 is connected to the inlet end fitting 1 and the outlet end fitting and defines a fluid passage through the inner hose 3. The inner hose 3 is made from an elastomer material, preferably a thermoplastic elastomer material molded or extruded to have a memory with a cross-sectional flat profile defining a collapsed position (empty) closing the fluid passage, and is expandable into an expanded position (full) opening the fluid passage as shown in FIG. 2.

Most preferably the inner hose 3 is made from a thermoplastic polyurethane material having a tensile strength between 5,000 to 11,000 psi and is produced by extrusion through a polished or plated dye to form the inner hose having a flat profile with a surface smoothness selected to prevent adherence of bacteria or algae thereon.

The outer hose 2 is disposed about the inner hose 3 and is also connected to the inlet end fitting 1 and the outlet end fitting.

A substantially sealed space or air chamber 9 having a predetermined initial pressure is disposed between the inner hose portion 3 and the outer hose portion 2. The space 9 preferably extends between the inlet end fitting 1 and an outlet end fitting.

In use, upon introduction of a pressurized fluid at the inlet end fitting 1 at a pressure exceeding the predetermined initial pressure, the inner hose 3 expands from the collapsed position to the expanded position to permit flow of the fluid through the fluid passage towards the outlet end fitting. This flow increases the pressure in the space 9 from the predetermined initial pressure, and upon termination of the introduction of the pressurized fluid to the inlet end fitting 1 the memory of the elastomer material of the inner hose 3 together with the increased pressure in space 9 collapses the inner hose 3 to the collapsed position expelling the fluid from the fluid passage.

The self-draining hose 100 in accordance with this embodiment provides a hose-within-a-hose system and may include a double-barbed end fitting that maintains the air seal in the space 9. Preferably the space holds a pressure of at least 5 psi between the two hoses. When pressurized fluid enters the inner hose 3, the inner hose 3 expands and when there is no pumping or fluid pressure, the air pressure within the space 9 assists to expels the fluid forcing it out the discharge end of the hose.

The outer hose 2 uses a material that allows for expansion unlike a rigid, or semi-rigid plastic pipe or rubber hose. The outer hose 2 may be made from a woven fire hose material with an elastomeric interior coating, an elastomeric material or a corrugated hose material.

Preferably the outer hose comprises a polyethylene elastomer material having a tensile strength between 1,000 to 4,000 psi. This material remains flexible to −40° C./F. While the inner hose 3 and outer hose 2 material selection is dependent on the intended use of the hose and the required water pressure rating for example, preferably, the inner hose 2 has a wall thickness between 0.010 to 0.045 inches and the outer hose 2 has a wall thickness between 0.020 inches to 0.075 inches.

The fire hose version provides a woven flat expandable outer hose 2, more easily allowing for visual inspection of the pre-charged air pressure in the space 9. Unpressurized the hose 100 would appear flat. Partially pressurized the hose 100 would appear semi-flat like an under inflated tire, and when pressurized to the recommended 5 psi the hose 100 appears almost round and is soft to the touch. During operation, with the introduction of fluid pressure the outer hose 2 of the hose 100 becomes fully round and hard to the touch. The woven hose 2 allows for an increase of pre-charged air pressure above the normal 5 psi used in the prior rigid outer pipe or hose. Increased air pressure improves both the speed (i.e. time taken to discharge the fluid to prevent freezing) as well as delivering improved lift (every 1 psi of pressure=2.31 feet of lift).

The flat woven fire hose jacket has the ability to expand without the need for an expansion tank to prevent chatter or vibration at the discharge end which can result in damage and failure of the inner hose. An alternative to the air expansion tank for longer lengths of hose is the implementation of an air expansion sleeve about the outer hose 2. A smooth surface such as the coated fire hose or other thermoplastic elastomers such as polyolefin can be fitted with a larger thin-walled elastomer sleeve covering an air access hole located near the discharge end of the hose 100, and then secured and clamped thereto. The sleeve is further reinforced with a protective larger, rigid sleeve which controls the extent of inflation of the elastomer sleeve.

The self-draining hose 100 may be provided with an air valve 7 through the outer hose 2, which allows it to move when it is in contact with any obstacle making it less likely to be caught and damaged as compared to an air valve on a rigid pipe or hose. For example, the flat woven fire hose version (minus the air) is much more compact and lighter than rigid hose for installation as well as handling, shipping, merchandising and storing.

The woven fire hose version of the outer hose 2 will also take much higher working pressures than the rigid, semi-rigid plastic pipe or rubber hose known in the art. This is particularly beneficial where large diameter hoses (4" and up) are required. These higher working pressures also help prevent kinking of the outer woven hose.

The hose 100 may also include a plastic or metal wire of sufficient rigidity woven into the fabric of an outer woven hose 2, and may include a plastic or metal wire 8 of sufficient structural rigidity placed between the inner hose portion 3 and the outer hose portion 2. The plastic or metal wire 8 placed loosely between the inner flat hose 3 and the outer woven hose 2, and/or woven into the fabric of the outer woven hose prevents or reduces kinking, or may be used to transmit electrical signals through the hose, as for example to connect to a hydraulic pump.

The inner hose 3 leaves a space 9 between the inner and outer hose 2. In order to fill this space and cushion the thin-walled inner hose 3 from damage by the clamp force that secures the inner hose 3 to the end fitting 1, a tight rubber-like bushing 4 is placed over the inner hose 3. Then a clamp 5 is applied directly over the bushing 4 to secure the inner hose 3 to the end fitting 1. A second clamp 6 is applied to secure the outer hose 2 on the end fitting 1.

Alternately, both clamps 5, 6 can be applied on the exterior of the outer hose 2, one over the area where bushing 4 fills and cushions the space 9 between the inner 3 and outer hoses 2, and the second against the shoulder of the fitting 1 reinforcing the air seal between the inner 3 and outer hoses 2, respectively. Applying two clamps to the exterior of the outer hose 2 better secures against air loss at a single potential pivot point.

Figure 3:
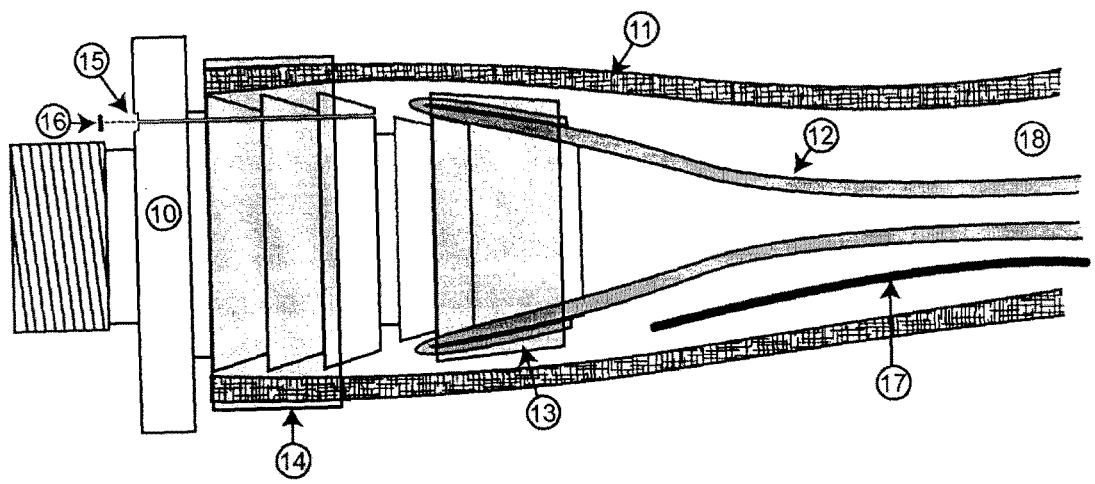
FIG. 3 is a diagrammatic cross section view of a self draining hose in accordance with a second embodiment of the invention.

FIG. 3 shows an alternative embodiment of a self-draining hose 200 in accordance with the invention. As shown in FIG. 3, the end fitting 10 may incorporate a point of air access 15 through the fitting 10. Preferably the fitting 10 is constructed from a thermoplastic material such as Acetal, or a NSF approved material like nylon. In order to pre-charge the space 18, the fitting 10 incorporates an air valve 16, as for example either a ball and spring assembly in the passageway or an elastomer orifice to be used with a needle (as in an inflatable soccer ball). Preferably, in this arrangement the clamping 13 of the inner hose 3 is done internally as shown in FIG. 3 and a second clamp 14 is used to secure the outer hose 11 to the fitting 10.

An alternative to the woven outer hose version uses a corrugated hose material, such as 1¼" or 1½" sump pump hose, providing a lower cost, non-kinking operation achieved without any pre-charged air aspect requiring an air valve, for uses that require little lift but need the hose to self-empty to minimize freezing. The inner hose 12 may also be made from an elastomer with a lower durometer and therefore more easily opened by low pressure. (e.g. 35 durometer is more elastic than 75 durometer). The inner hose 12 can be made of a material with a durometer that matches the requirements of the specific low pressure application. The inner hose 12 may be installed and air-sealed, using a double-barbed end fittings 10, into a 1¼" or 1½" corrugated style hose, such as sump pump hose. The corrugated outer jacket limits and supports the expansion of the inner hose 12.

Low pressure pumps, such as sump pumps, deliver adequate pressure for easy expansion of the inner hose during flow periods. As the water pressure expands the inner flat hose 12, from about 10 to 12 psi is developed in the air chamber 18 between the inner hose 12 and the corrogated outer hose 11 which is more than ample to discharge any water remaining in the inner hose 12 at the conclusion of pumping.

The inner hose 12 can be extruded or molded using a thin-walled flat profile that promotes a more complete collapse of the inner hose when there is no fluid pressure expanding it. The inner hose 12 can be made of polyurethane or a similar high tensile strength (5,000 to 7,000 PSI) hose material with elastic qualities such as a polyolefin elastomer. The flat profile as shown for example in FIG. 2 includes a half-moon cross-sectional profile having a concave surface folded in mating relationship on top of the opposing matching concave surface. This concavity relationship provides additional strength to the hose 12.

The inner hose 12 may be formed from a polyurethane or elastomeric material and can be further strengthened through an orienting process that increases its tensile strength 3-fold, increasing the pressure rating for the hose.

The inner hose 12 and outer hose 11 may be made of a transparent material, which allows for visual inspection of the conditions within the hoses and allows sunlight exposure along with dewatering to control bacteria growth and can be made with a material, such as polyurethane, that is NSF approved for potable drinking water use. The hoses 12, 11 may also include phosphorescent additives or light bending additives to increase the visibility of the inner hose 12 and outer hose 11.

Figure 4:
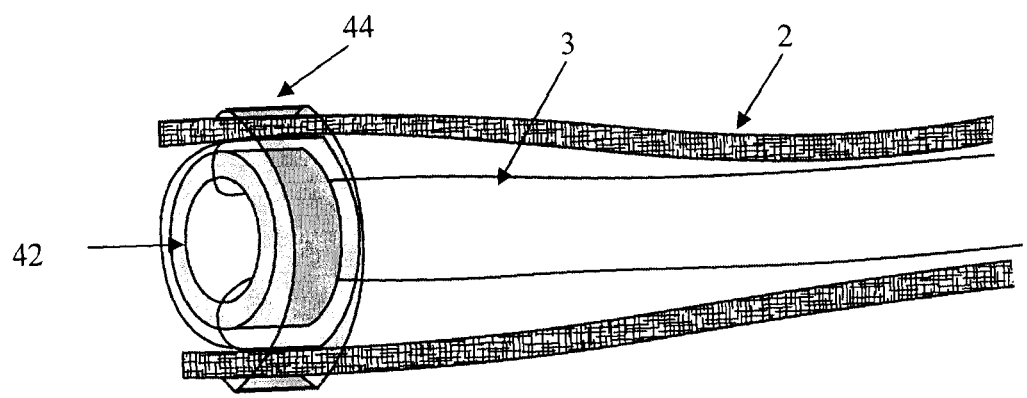
FIG. 4 is a diagrammatic illustration of an open end fitting for the self draining hoses shown in FIGS. 1 and 3.

FIG. 4 illustrates and open end fitting 40 for the self-draining hose in accordance with the present invention. To form the open end fitting 40, the inner hose 12 is pulled through and back over a circular donut 42 and sandwiched between the outer circumference of the donut 42 and the outer hose 11. A clamp 44 is positioned about the outer hose 11 over the donut and a clamping force is applied to secure the inner hose 12 between the donut 42 and the outer hose 11.

Figure 5:
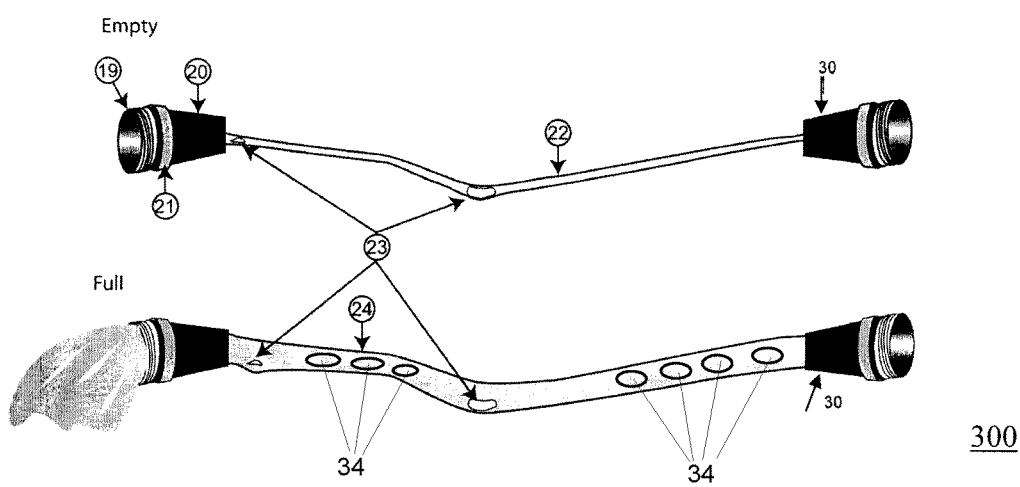
FIG. 5 is a diagrammatic cross section view of a self draining hose in accordance with a third embodiment of the invention, showing the hose separately in empty and full states, respectively, and showing how the hose stretches to accommodate residual ice in the hose.
Figure 6:
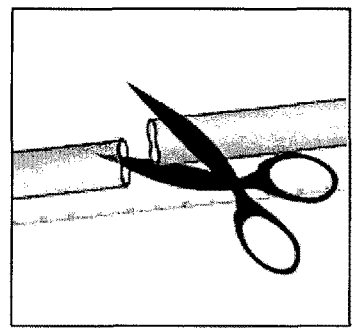
FIG. 6 is a diagrammatic illustration of a method for assembling a self draining-hose in accordance with the present invention.
Figure 6:
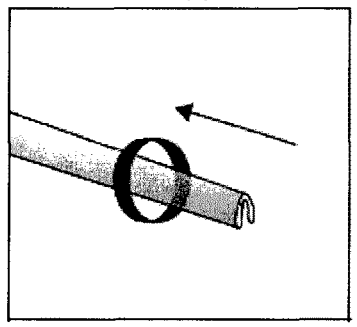
Figure 6:
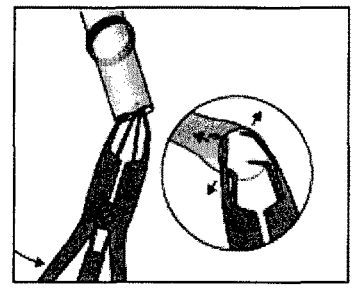
Figure 6:
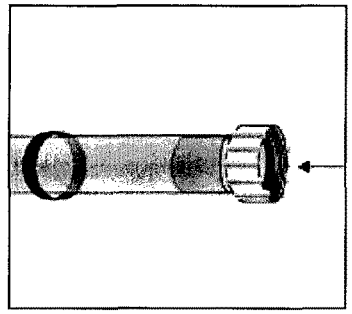
Figure 6:
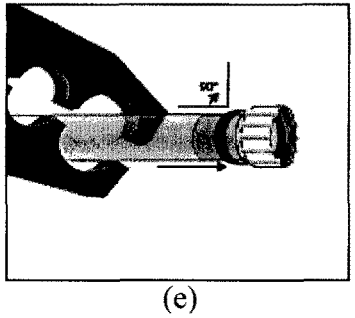

FIG. 5 illustrates a further embodiment of a self-draining hose 300 in accordance with the present invention. The self-draining hose 300 includes a flexible hose 22 connected to an inlet end fitting 30 and an outlet end fitting 20 and defines a fluid passage through the flexible hose 22. The flexible hose 22 is made from an elastomer material having a memory with a cross-sectional flat profile defining a collapsed position closing the fluid passage, and is expandable to an expanded position opening the fluid passage.

In use, upon introduction of a pressurized fluid at the inlet end fitting 30 the flexible hose 22 expands (24) from the collapsed position to the expanded position to permit flow of the fluid through the fluid passage towards the outlet end fitting 20. Upon termination of the introduction of the pressurized fluid at the inlet end fitting 30 the memory of the elastomer material collapses the flexible hose 22 from the expanded position (24) to the collapsed position expelling the fluid from the fluid passage.

The hose 22 provides similar discharge capabilities as the inner hoses 3 and 12 of the hoses 100 and 200 described above when there is no fluid pressure expanding the hose 22. The discharge may be enhanced with the use of a vacuum breaker installed at the fluid source. The hose 22 is flexible to −40° C./F but is subject to climate conditions such as wind-chill and snow cover which influence minimum temperature at which it will operate. For example, −10° C./14° F. is the recommended lowest temperature for effective operating with high wind-chill, however, with no wind or insulating snow cover, operating temperatures will be considerably lower.

Preferably, the flexible hose 22 is made from a thermoplastic elastomer material, such as a thermoplastic polyurethane material and has a tensile strength between 5,000 to 11,000 psi with elastic qualities, such as a polyolefin elastomer, as for example having a Shore A durometer range between 75 and 95. It is to be understood that the selection of the elastomer material and wall thickness of the flexible hose 22 is such that it is to be sufficiently stretchable to allow the fluid in the fluid passage to flow around impediments blocking the flow of the fluid through the fluid passage. For a flexible hose 22 having an internal diameter of ⅝ inches, the wall thickness of the flexible hose is preferably at least 0.045 inches.

The hose 22 uses its elastic qualities to stretch when fluid pressure encounters impediments 23, as for example ice formed in the fluid passage. Fluid pressure expands the hose 22(24) to allow flow around residual ice 23 in the fluid passage of the hose 22(24), and the flow of fresh, comparatively warmer fluid will melt the residual ice in the hose 22(24).

In a preferred aspect, the flexible hose 22 may include and outlet end fitting which caps the end of the hose 22 and a plurality of apertures 34 which extend between the fluid passage and an exterior of the flexible hose 22. The apertures 34 may be aligned linearly along a length of the flexible hose 22 so that the hose 22 may be used for example as a sprinkler garden hose. Preferably, the self-draining hose 22 is fully recyclable.

The flexible hose 22 most preferably is produced by extrusion using a thin-walled flat profile that promotes a more complete collapse of the hose 22 when there is no fluid pressure expanding it. Preferably the flexible hose 22 is extruded through a polished or plated dye to form the flexible hose 22 having the cross-sectional flat profile with a surface smoothness selected to prevent adherence of bacteria or algae thereon. The flexible hose and the inlet end fitting and the outlet end fitting may be composed of a NSF approved material so that the hose can be used to transport drinking water without adding toxins to the water.

The flexible hose 22 may be transparent and include phosphorescent additives and/or light bending additives which enhance the visibility of the flexible hose 22.

The inlet end fitting 30 and the outlet end fitting 20 may be sealing secured to the flexible hose by a crimp-type ring clamp in accordance with the steps illustrated in FIG. 5 as follows:

(a) Measure and cut required length of hose (b) Fold hose to minimize width and slip a PEX ring over the end of the hose (c) Hose may need to be stretched to accept fitting. Either immerse hose end in hot water or use stretcher tool as shown.

(d) Insert fitting, wiggling the hose from side to side, until hose end is half the width of the PEX ring from the fittings shoulder.

(e) Slide PEX ring over fitting as shown. If needed use closed crimping tool to push ring. Then position crimping tool over the ring at a 90° angle to the hose and compress securely.

Repeat steps 2, 3, 4 and 5 for the other end of the hose.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

We claim:

1. A stand-alone self-draining hose, comprising:
a flexible hose having a length connected to an inlet end fitting and an outlet end fitting and defining a fluid passage through the flexible hose, the flexible hose comprises transparent thermoplastic elastomer material having a tensile strength between 5,000 to 11,000 psi and having a memory with a cross-sectional flat profile defining a collapsed position closing the fluid passage along the length of the hose, the flexible hose being expandable to an expanded position opening the fluid passage;
whereby, in use, upon introduction of a pressurized fluid at the inlet end fitting the flexible hose expands from said collapsed position to said expanded position to permit flow of the fluid through the fluid passage towards the outlet end fitting, whereby upon termination of the introduction of the pressurized fluid at the inlet end fitting the memory of the elastomer material collapses the flexible hose from said expanded position to said collapsed position expelling the fluid from the fluid passage.

2. The self-draining hose according to claim 1, wherein the hose comprises a thermoplastic polyurethane material.

3. The self-draining hose according to claim 1 wherein the flexible hose is produced by extrusion through a polished or plated dye to form the flexible hose having the cross-sectional flat profile with a surface smoothness selected to prevent adherence of bacteria or algae thereon.

4. The self-draining hose according to claim 1 wherein the transparent thermoplastic elastomer material and the inlet end fitting and the outlet end fitting are composed of a NSF approved material.

5. The self-draining hose according to claim 1 wherein the flexible hose has an internal diameter of at least ⅝ inches and comprises a wall thickness of at least 0.045 inches.

6. The self-draining hose according to claim 1, where the elastomer material comprises at least one of a phosphorescent additive and a light bending additive.

7. The self-draining hose according to claim 1 wherein the flexible hose remains flexible up to −40° C.

8. The self-draining hose according to claim 1 wherein the elastomer material is sufficiently stretchable to allow the fluid in the fluid passage to flow around impediments blocking the flow of the fluid through the fluid passage.

9. The self-draining hose according to claim 1 wherein at least one of the inlet end fitting and the outlet end fitting is sealing secured to the flexible hose by a crimp-type PEX ring clamp.

10. The self-draining hose according to claim 1 where the flexible hose has a Shore A durometer range between 75 and 95.

11. The self-draining hose according to claim 1 where the self-draining hose is fully recyclable.

12. The self-draining hose according to claim 1 wherein the flexible hose defines a plurality of apertures extending between the fluid passage and an exterior of the flexible hose.

13. The self-draining hose according to claim 12, wherein the plurality of apertures are aligned linearly along a length of the flexible hose, and the outlet end fitting defines an end cap of the flexible hose.

* * * * *